No. 618,349. Patented Jan. 24, 1899.
J. A. HEANY.
DISINFECTING APPARATUS.
(Application filed Mar. 3, 1898.)
(No Model.)
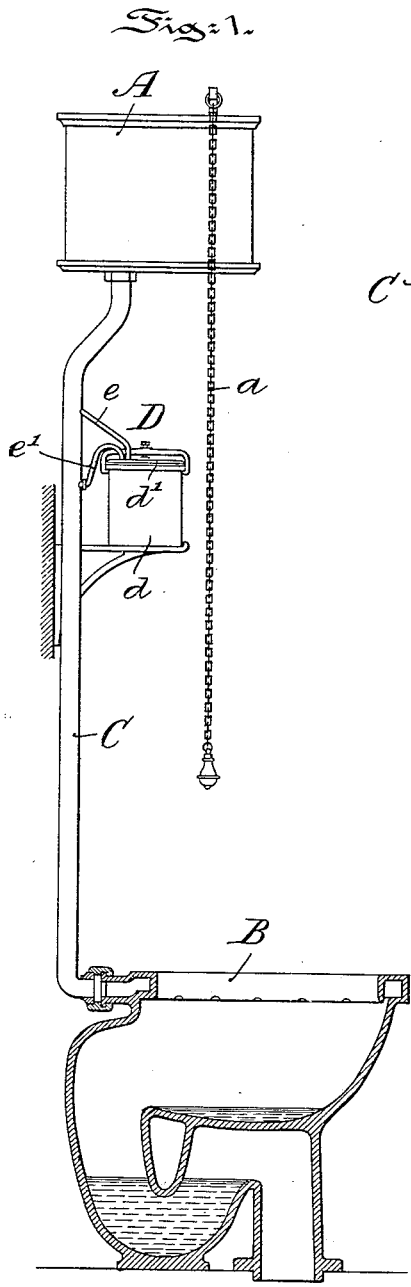
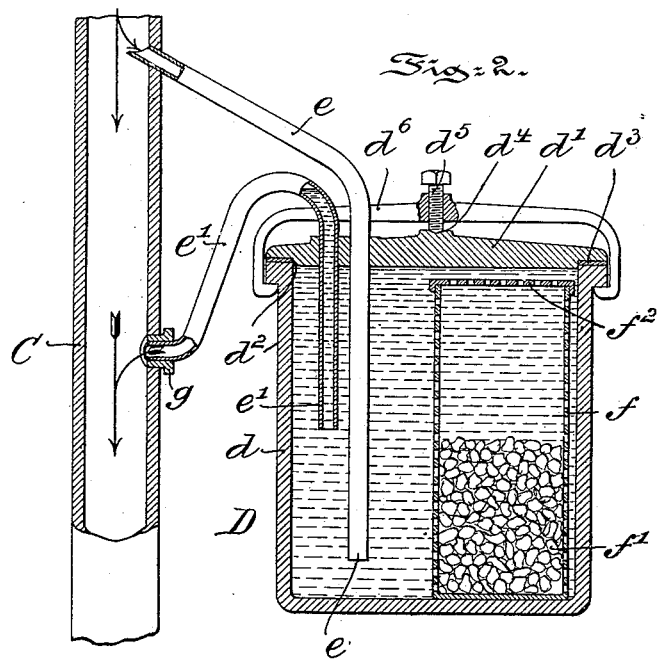
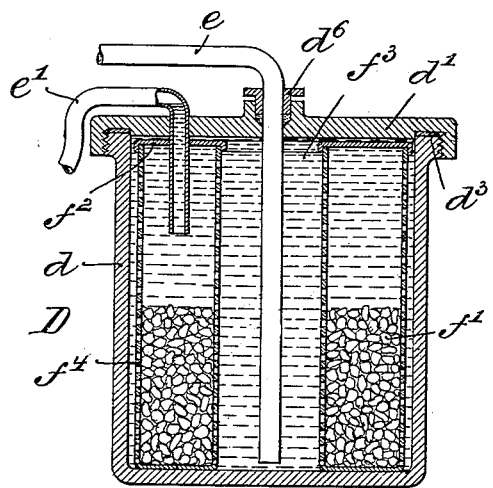
Witnesses:
Richard C. Maxwell.
Thomas M. Smith.
Inventor:
John A. Heany,
By J. Walter Douglass,
Attorney.

UNITED STATES PATENT OFFICE.

JOHN A. HEANY, OF PHILADELPHIA, PENNSYLVANIA, ASSIGNOR TO J. WALTER DOUGLASS, OF SAME PLACE.

DISINFECTING APPARATUS.

SPECIFICATION forming part of Letters Patent No. 618,349, dated January 24, 1899.

Application filed March 3, 1898. Serial No. 672,464. (No model.)

*To all whom it may concern:*

Be it known that I, JOHN A. HEANY, a citizen of the United States, residing in the city of Philadelphia, in the county of Philadelphia and State of Pennsylvania, have invented certain new and useful Improvements in Disinfecting Apparatus, of which the following is a specification.

My invention relates to an apparatus for disinfecting water-closets, urinals, and other similar appliances, so as to maintain the same in a good sanitary condition; and in such connection my invention relates to the construction and arrangement of disinfecting means for such appliances or apparatus for the defined purposes.

The principal objects of my invention are, first, to provide a simple, durable, effective, and easily-manipulated disinfecting means for water-closets or analogous appliances for maintaining such appliances in a good sanitary state or condition; second, to provide a disinfecting appliance for use in conjunction with the flushing-tank and supply to the bowl of a water-closet, whereby the fluid supplied to the bowl is disinfected in passage from the flushing-tank to the closet-bowl in order to maintain the closet or the like in a good sanitary condition, and, third, to provide a disinfecting appliance for interposition between the flushing-tank and bowl of the water-closet and readily accessible for supplying the removable cage or holder with suitable disinfecting matter through which the water or other fluid from the flushing-tank passes to be charged or impregnated with the disinfectant supplied therefrom to the bowl of the closet, and thereby the latter from a hygienic standpoint maintained in a good sanitary condition.

My invention, stated in general terms, consists of a disinfecting apparatus when constructed and arranged in substantially the manner hereinafter described and claimed.

The nature and scope of my invention will be more fully understood from the following description, taken in connection with the accompanying drawings, forming part hereof, in which—

Figure 1 is a side elevational view, partly in section, of a disinfecting apparatus embodying main features of my present invention in one form interposed between the flushing-tank and bowl of a water-closet and the pipe connections thereof. Fig. 2 is a vertical sectional view of the disinfecting appliance of Fig. 1, on a larger scale, connected with the conduit or pipe adapted to connect the flushing-tank with the bowl of a water-closet, not shown; and Fig. 3 is a similar view of a modified form of the disinfecting appliance or apparatus of my said invention.

Referring to the drawings, A represents a flushing-tank of the ordinary construction with its valve accessories and chain-pull $a$.

B is the bowl of the water-closet, connected with the elevated flushing-tank A by means of a conduit or pipe C in any suitable manner.

D in Figs. 1 and 2 is the disinfecting appliance of my invention, consisting of a vessel $d$, provided with a removable cap or cover $d'$, recessed adjacent to the periphery on the under side at $d^2$ and so as to rest in place on the top of the vessel $d$ upon a rubber or other suitable gasket $d^3$. The middle of the cap or cover $d'$ is provided with a seat $d^4$ to receive the end of a tightening-screw $d^5$ of a spanning-clamp $d^6$, adapted to detachably secure the cap or cover to the vessel $d$.

$e$ and $e'$ are inlet and outlet pipes, respectively, from the vessel $d$ to the conduit or pipe C, connecting the elevated water flushing-tank A with the water-closet B. The pipe $e$ extends through the cap or cover into the vessel $d$ to near the bottom thereof, while the siphon-pipe $e'$ extends a less distance through the cap or cover $d'$ into the said vessel—for example, as clearly illustrated in Fig. 2.

$f$ is a wire or gauze cage or holder for a suitable disinfecting substance or material $f'$ and provided with a removable lid or top $f^2$. The fluid, as water, from the flushing-tank by operating the chain-pull $a$ passes into the pipe C, and a portion of the same then flows in due course through the pipe $e$ into the vessel $d$ and permeating the disinfecting substance in suitable form in the cage or holder $f$ and rising in the vessel $d$ impregnated with the disinfecting matter and which is siphoned off through the pipe $e'$ into and through the conduit or pipe C to the bowl of the water-closet A for cleansing or washing the same as well as keeping the bowl at all times in a good sanitary condition.

It may be here remarked that the vessel $d$ will be maintained after the first supply thereto with a certain quantity of fluid impregnated with the disinfecting matter, and by then operating the pull of the tank the vessel will be supplied with water from the tank to cause by the suction of air in the conduit C, between and above the pipes $e$ and $e'$, the overflow of the impregnated fluid from said vessel $d$ through the pipe $e'$ and conduit C to the closet B to maintain the closet in a good sanitary condition.

By arranging the connection of the inlet-pipe $e$ with the conduit C above the connection of the siphon-pipe $e'$ and by extending the discharge end of the pipe $e$ below the inlet end of the siphon-pipe $e'$ in the vessel $d$ it will be found that when water ceases to flow through the conduit C the siphon-pipe $e'$ will continue to discharge disinfectant into said conduit. Hence instead of the disinfectant being all washed through the bowl or closet B into the discharge-pipe of the said closet a portion of said disinfectant will remain in the bowl, whereby both closet and its waste-pipe are automatically disinfected.

In Fig. 3 the vessel $d$ is provided with an internal double-perforated cage or holder $f^1$, with a removable cover or lid $f^2$, and with a central bore $f^3$, into which extends the supply-pipe $e$, connected with the conduit C of Figs. 1 and 2. This pipe $e$ extends downward through the gland $d^{16}$ of the threaded cap or cover $d'$, secured to the threaded top of the vessel $d$. In this instance the siphoning-off or outlet pipe $e'$ of the vessel extends into one portion of the cage $f^4$ and is intended to be connected, as in Figs. 1 and 2, with the conduit C, leading from the flushing-tank A to the water-closet B, as shown in Fig. 1 of the drawings. The fluid from the elevated tank in Fig. 3, flowing through the pipe $e$ to near the bottom of the vessel $d$, then passes throughout the body of disinfecting matter in the gauze or wire cage $f^4$, rising therein and passing off by the suction action induced from the pipe C through the siphoning-pipe $e'$ and the conduit C into the bowl of the closet A.

In Fig. 2 in the pipe C, where the pipe $e'$ unites with the same, is provided the connection $g$ therefor in order that a tight, yet removable, connection of the pipe $e'$ with the said conduit C may be had.

Having thus described the nature and objects of my invention, what I claim as new, and desire to secure by Letters Patent, is—

In a disinfecting apparatus, the combination with a bowl or closet and a flushing pipe or conduit suitably connected therewith, of a disinfecting vessel, a discharge-pipe entering the top of and traversing said vessel and connecting the same with the flushing-conduit and a siphon-pipe entering the top of and connecting the vessel with the conduit, the inlet of said siphon-pipe extending downward into said vessel and terminating above the discharge end of the discharge-pipe, and the outlet of said siphon-pipe into the conduit being arranged below the connection of the discharge-pipe with said conduit, substantially as and for the purposes described.

In testimony whereof I have hereunto set my signature in the presence of two subscribing witnesses.

JOHN A. HEANY.

Witnesses:
J. WALTER DOUGLASS,
THOMAS M. SMITH.